(12) United States Patent
Griessbaum et al.

(10) Patent No.: US 9,354,100 B2
(45) Date of Patent: *May 31, 2016

(54) DEVICE AND METHOD FOR DETERMINING MEDIA CHARACTERISTICS AND CONTAINER CHARACTERISTICS

(75) Inventors: Karl Griessbaum, Muehlenbach (DE); Roland Welle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 292 days.

This patent is subject to a terminal disclaimer.

(21) Appl. No.: 13/454,715

(22) Filed: Apr. 24, 2012

(65) Prior Publication Data

US 2012/0299768 A1 Nov. 29, 2012

Related U.S. Application Data

(60) Provisional application No. 61/490,745, filed on May 27, 2011.

(30) Foreign Application Priority Data

May 27, 2011 (EP) .................................. 11167946

(51) Int. Cl.
| | | |
|---|---|---|
| *G01F 23/284* | (2006.01) | |
| *G01F 23/296* | (2006.01) | |
| *G01F 23/292* | (2006.01) | |
| *G01S 7/292* | (2006.01) | |
| *G01S 13/10* | (2006.01) | |

(Continued)

(52) U.S. Cl.
CPC ............ *G01F 23/284* (2013.01); *G01F 23/292* (2013.01); *G01F 23/296* (2013.01); *G01F 23/2962* (2013.01); *G01S 7/292* (2013.01);

*G01S 13/103* (2013.01); *G01S 13/88* (2013.01); *G01S 15/88* (2013.01); *Y10S 367/908* (2013.01)

(58) Field of Classification Search
CPC .............. G01F 23/284; G01F 23/2845; G01F 23/296–23/2968
USPC ........................................................ 342/124
See application file for complete search history.

(56) References Cited

U.S. PATENT DOCUMENTS

| | | | |
|---|---|---|---|
| 5,438,867 A | 8/1995 | van der Pol | |
| 5,587,969 A * | 12/1996 | Kroemer et al. | ................. 367/99 |
| 7,284,425 B2 | 10/2007 | Wennerberg et al. | |

(Continued)

FOREIGN PATENT DOCUMENTS

| | | |
|---|---|---|
| CN | 102 042 860 | 5/2011 |
| DE | 42 23 346 | 1/1994 |

(Continued)

OTHER PUBLICATIONS

Devine, "*Radar Level Measurement, The User's Guide*", Vega Contols, 2000, 154 pages (English Translation of first 17 pages is provided).

*Primary Examiner* — Matthew M Barker
(74) *Attorney, Agent, or Firm* — Fay Kaplun & Marcin, LLP

(57) ABSTRACT

A fill-level measuring device includes a self-learn device that is able to automatically determine the length of the dome shaft of the container. To this effect the self-learn device uses a multiple echo classified as such by a multiple-echo detection device. In this manner the result of fill level measuring may be improved.

7 Claims, 9 Drawing Sheets

(51) Int. Cl.
G01S 13/88 (2006.01)
G01S 15/88 (2006.01)

(56) References Cited

U.S. PATENT DOCUMENTS

| | | | |
|---|---|---|---|
| 7,454,969 B2 * | 11/2008 | Hart | 73/306 |
| 7,954,378 B2 | 6/2011 | Hasieber et al. | |
| 8,159,386 B2 * | 4/2012 | Malinovskiy et al. | 342/124 |
| 8,276,444 B2 * | 10/2012 | Malinovskiy et al. | 73/290 V |
| 9,068,876 B2 * | 6/2015 | Griessbaum | G01F 23/28 |
| 2002/0053239 A1 | 5/2002 | Fehrenbach et al. | |
| 2008/0060431 A1 | 3/2008 | Frovik | |
| 2009/0158839 A1 | 6/2009 | Spanke et al. | |
| 2010/0115486 A1 | 5/2010 | Barnes et al. | |
| 2011/0231118 A1 | 9/2011 | Welle | |

FOREIGN PATENT DOCUMENTS

| | | |
|---|---|---|
| DE | 42 33 324 | 4/1994 |
| DE | 43 08 373 | 9/1994 |
| DE | 198 24 267 | 12/1999 |
| DE | 10 2004 061 449 | 6/2006 |
| DE | 10 2007 060 579 | 7/2009 |
| EP | 1 066 538 | 1/2001 |
| EP | 1 191 315 | 3/2002 |
| EP | 1 906 158 | 4/2008 |
| EP | 1 936 403 | 6/2008 |
| EP | 2 309 235 | 4/2011 |
| WO | 2006/063933 | 6/2006 |
| WO | 2006/068604 | 6/2006 |
| WO | 2009/037000 | 3/2009 |

* cited by examiner

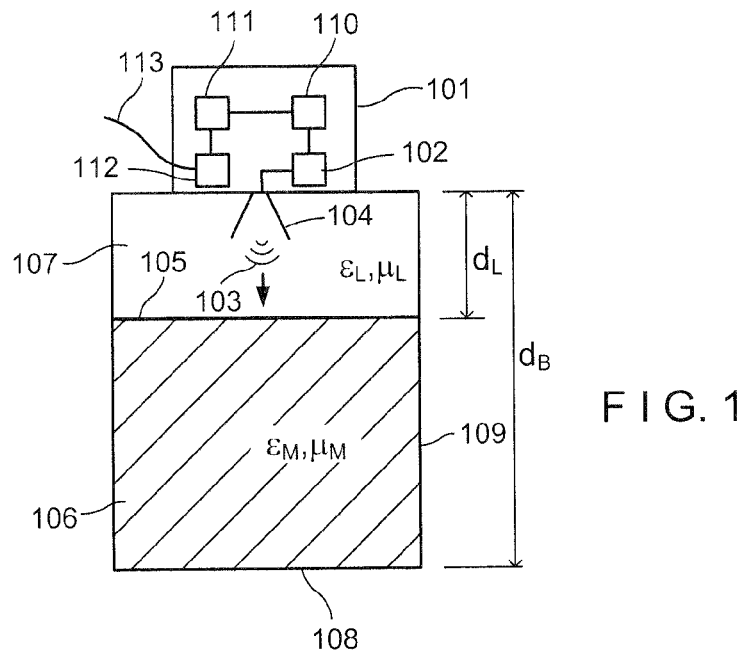
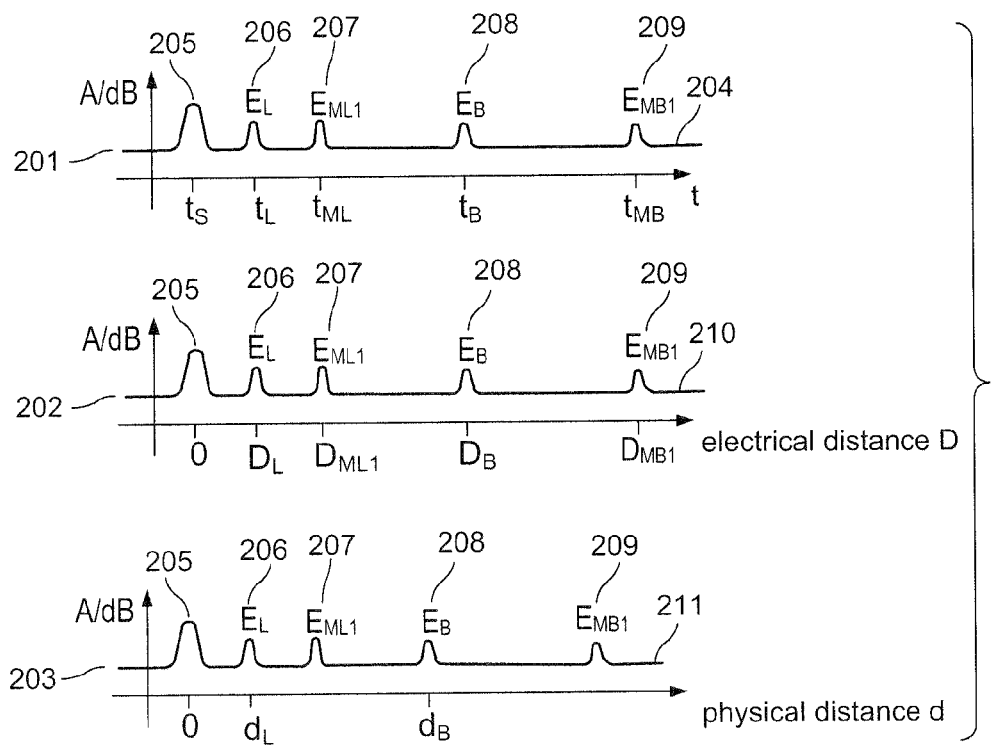
FIG. 1
FIG. 2

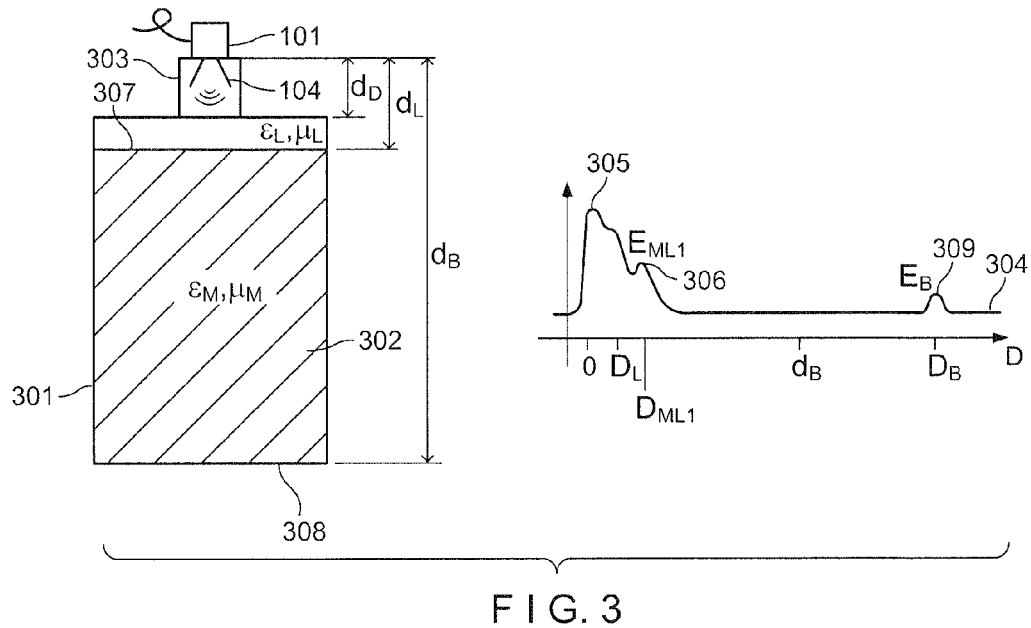
F I G. 3
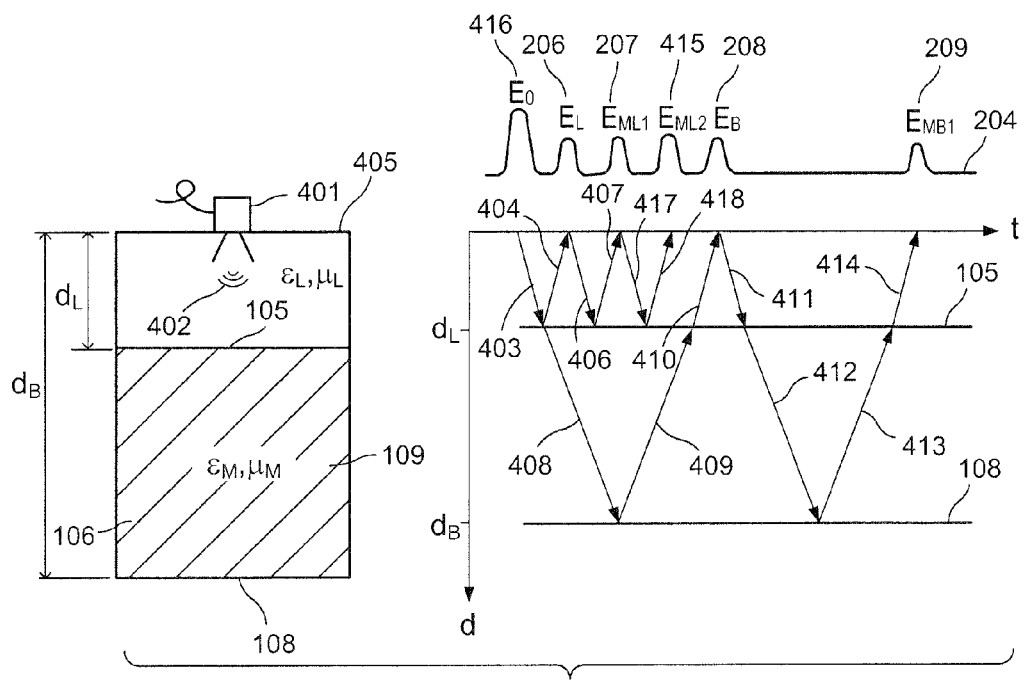
F I G. 4

DEVICE AND METHOD FOR DETERMINING MEDIA CHARACTERISTICS AND CONTAINER CHARACTERISTICS

REFERENCE TO RELATED APPLICATIONS

This application claims the benefit of the filing date of EP Patent Application Serial No. EP 11 167 946.0 filed 27 May 2011 and U.S. Patent Application Ser. No. 61/490,745 filed 27 May 2011, the disclosure of both applications are hereby incorporated by reference.

FIELD OF THE INVENTION

The present invention relates to fill level measuring. In particular, the invention relates to a fill-level measuring device for determining the position of a fill level of a feed material and/or of an interface between two feed materials for determining media characteristics and container characteristics when measuring fill levels of any kind, to a corresponding method, to a program element and to a computer-readable medium.

BACKGROUND INFORMATION

In fill level sensors operating according to the FMCW or pulse-transit time method, electromagnetic or acoustic waves are emitted in the direction of a feed material surface. Following this, a sensor records the echo signals reflected by the feed material, by the objects built into the container, and by the container itself, and from this derives the position of a surface of at least one of the feed materials contained in the container.

With the use of acoustic or optical waves the signal generated by the fill-level measuring device generally propagates freely in the direction of the feed material surface to be measured. In devices that use radar waves for measuring the feed material surface, both free propagation in the direction of the medium to be measured can be considered, and propagation in the interior of a waveguide that guides the radar waves from the fill-level measuring device to the medium. In devices operating according to the principle of the guided microwave the high-frequency signals are guided along a waveguide to the medium.

At the surface of the medium or fill level to be measured, some of the arriving signals are reflected and after a corresponding transit time return to the fill-level measuring device. The non-reflected signal components penetrate the medium and in the medium continue to propagate, corresponding to the physical characteristics of the medium, in the direction of the container bottom. At the container bottom these signals, too, are reflected and after passing through the medium and the overlaid atmosphere return to the fill-level measuring device.

The fill-level measuring device receives the signals, which have been reflected at different positions, and from them determines the distance to the feed material according to known methods. The determined distance to the feed material is made available externally. Such provision can be implemented in an analog form (4 . . . 20 mA interface) or in a digital form (fieldbus).

All the methods share a common feature in that on its way from the fill-level measuring device to the feed material surface the signal used for measuring is normally in the region of influence of a further medium, which hereinafter is referred to as the overlay medium. This overlay medium is situated between the fill-level measuring device and the surface of the medium to be measured, and is generally represented by a liquid or by a gaseous atmosphere.

In a predominant number of applications there is air above the medium to be measured. Since the propagation of electromagnetic waves in air differs only insignificantly from that in a vacuum, there is no need to carry out any special corrections of the signals that are reflected, through the air back to the fill-level measuring device, by the feed material, by the objects built into the container, and by the container itself.

Furthermore, however, in process containers of the chemical industry many types of chemical gases and gas mixtures can occur as overlay media. Depending on the physical characteristics of these gases or gas mixtures, the propagation characteristics of electromagnetic waves are changed when compared to propagation in a vacuum or in air.

Known attempts at determining media characteristics and container characteristics are often associated with significant weaknesses.

SUMMARY OF THE INVENTION

It would be desirable to have a robust method and a device for determining media characteristics and container characteristics. Furthermore, it would be desirable to have a method and a device for automatically determining the parameters when taking interface measurements.

Stated are a fill-level measuring device for determining the position of a fill level and/or of an interface between two feed materials, which are, for example, contained in a container; a method, a program element and a computer-readable medium according to the characteristics of the independent claims. Developments to the invention are stated in the subordinate claims as well as in the following description.

It should be pointed out that hereinafter with regard to the fill-level measuring device the above-mentioned characteristics may also be implemented as method-related steps in the method, and vice versa.

According to a first aspect of the invention, a fill-level measuring device for determining the position of a fill level of a feed material which is, for example, contained in a container, and/or of an interface between two feed materials is stated. The fill-level measuring device comprises an echo-curve acquisition device for acquiring one or several echo curves, an echo identification device for evaluating the at least one echo curve, a multiple-echo detection device for evaluating the at least one echo curve, a multiple-echo detection device for classifying one or several echoes of a multiple reflection from a feed material surface and/or from a container bottom of the container as a multiple echo, as well as a device, which may have "self-learning" ability and may for this reason, also be denoted as "self-learning", and which is designed for automatically determining the length of the dome shaft of the container with the use of the multiple echo classified by the multiple-echo detection device.

According to a further aspect of the invention the fill-level measuring device may comprise a position determination device. The echo identification device may be designed for identifying several echoes in the echo curve, and the multiple-echo detection device can be designed for classifying at least two of the several echoes as multiple echoes. Furthermore, the position determination device can be designed for determining positions of the at least two multiple echoes, and the self-learn device can be designed for using the positions of the at least two multiple echoes for determining the length of the dome shaft.

According to a further aspect of the invention, the self-learn device for use of the orders of the at least two multiple echoes may be designed for determining the length of the dome shaft.

According to a further aspect of the invention, the echo identification device may be designed for identifying several echoes in the echo curve, and the multiple-echo detection device can be designed for classifying two or more echoes as multiple echoes.

Furthermore, the fill-level measuring device may comprise a speed determination device for determining a first speed vector of a first multiple echo of the echoes classified as multiple echoes, and for determining a second speed vector of a second multiple echo of the classified multiple echoes. The self-learn device is designed for determining an intersection of at least two of the determined speed vectors for determining the length of the dome shaft.

According to a further aspect of the invention, a method for determining the position of a fill level of a feed material in a container and/or of an interface between two feed materials in a container is stated. Acquisition of at least one echo curve takes place, which echo curve is subsequently evaluated. Furthermore, classification of at least one echo of a multiple reflection from a feed material surface of the feed material and/or from a container bottom of the container takes place as a multiple echo. Furthermore, automatic determination of a length of the dome shaft of the container takes place with the use of the multiple echoes classified by the multiple-echo detection device.

According to a further aspect of the invention, a program element is stated which, when executed on a processor of a fill-level measuring device, instructs the processor to carry out the steps described above and/or below.

Furthermore, a computer-readable medium for storing a program element is stated which, when executed on a processor of a fill-level measuring device, instructs the processor to carry out the steps described above and/or stated below.

The program element (referred to as the "computer program element") can form part of software that is stored on a processor of the fill-level measuring device. In this arrangement the processor can also be the subject of the invention. Furthermore, this aspect of the invention comprises a computer program element that from the very beginning uses the invention, as well as a computer program element, which by way of an update causes an existing program to use the inventions.

It should be pointed out that the term "feed material echo" equates to a multiple echo of the order of zero of the feed material reflection.

Furthermore, it should be pointed out that the term "bottom echo" equates to a multiple echo of the order of zero of the bottom reflection.

BRIEF DESCRIPTION OF THE FIGURES

FIG. 1 shows a fill-level measuring device that operates according to a transit time method.

FIG. 2 shows method-related steps for determining the fill level according to a transit time method.

FIG. 3 shows conditions where the container basin is not straight.

FIG. 4 shows an example of fill level measuring with multiple echoes.

DETAILED DESCRIPTION

Figure 5:
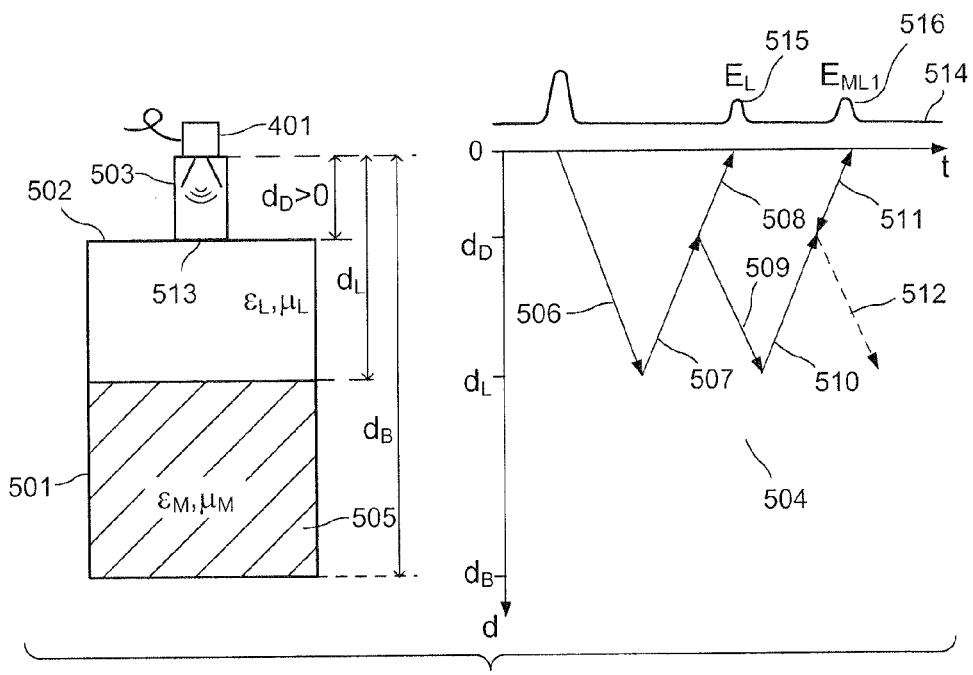
FIG. 5 shows an example of fill level measuring in a dome shaft.

The illustrations in the figures are diagrammatic and not to scale.

If in the following description of the figures in different figures the same reference characters are used, they designate identical or similar elements. However, identical or similar elements can also be designated by different reference characters.

It should be pointed out that the term "feed material echo" equates to a multiple echo of the order of zero of the feed material reflection.

Furthermore, it should be pointed out that the term "bottom echo" equates to a multiple echo of the order of zero of the reflection of the bottom of the container.

The explanations below concentrate on considering the frequently-occurring application case of a single medium or feed material to be measured in a container. The technical teaching described below can be transposed to the application case of two or several different media or feed materials in a container. In the context of interface measuring, the position of a feed material surface may, in particular, also be the position of an interface between two different media or feed materials, which position is identical to the position of the feed material surface of the lower of the two feed materials or media in a container for interface measuring.

In devices for fill level measuring, various methods can be used according to which the position of a feed material surface in a container can be determined.

FIG. 1 shows an arrangement for fill level measuring. The container 100 contains a liquid 106 up to a fill height $d_B - d_L$. The space 107 above the liquid contains, for example, air. In the present example the liquid is covered by air as an overlay medium.

By means of a high-frequency device 102 the fill-level measuring device 101 generates an electromagnetic pulse 103 and couples it into a suitable antenna 104, whereupon this pulse propagates almost at the speed of light in the direction of the feed material surface 105 to be measured. The precise speed within the overlay medium results from:

$$c_L = \frac{c_0}{\sqrt{\varepsilon_L \cdot \mu_L}}$$

wherein $c_0$ denotes the speed of light in a vacuum, $\varepsilon_L$ the permittivity value of the overlay medium, and $\mu_L$ the permeability value of the overlay medium.

The feed material surface 105 reflects part of the incoming signal energy, whereupon the reflected signal component propagates back to the fill-level measuring device 101. The non-reflected signal component penetrates the liquid 106, and within it propagates at a greatly reduced speed in the direction of the container bottom. The speed $c_M$ of the electromagnetic wave 103 within the liquid 106 is determined by the materials characteristics of the liquid 106:

$$c_M = \frac{c_0}{\sqrt{\varepsilon_M \cdot \mu_M}}$$

wherein $c_0$ denotes the speed of light in a vacuum, $\varepsilon_M$ the permittivity value of the liquid, and the permeability value of the liquid. At the bottom 108 of the container 109 the remaining signal component is also reflected and, after a corresponding transit time, returns to the fill-level measuring device 101. In the fill-level measuring device the incoming signals are processed by means of the high-frequency device 102, and are preferably transformed to a lower-frequency intermediate frequency range. By means of an analog/digital converter unit 110, the analog echo curves, which are provided by the high-frequency device 102, are digitized and made available to an evaluation device 111.

The above-mentioned components, which are used to provide a digitized echo curve, in other words in particular the high-frequency device 102 and the analog/digital converter unit 110, may, as an example, define an echo-curve acquisition device.

The evaluation device 111 analyzes the digitized echo curve and, on the basis of the echoes contained therein determines according to known methods that echo that was generated by the reflection from the feed material surface 105. Furthermore, the evaluation device determines the precise electrical distance to this echo. Furthermore, the determined electrical distance to the echo is corrected in such a manner that influences of the overlay medium 107 on the propagation of the electromagnetic waves are compensated for. The compensated distance to the feed material, which distance has been calculated in this manner, is conveyed to an output device 112, which further processes the determined value according to user specifications, for example by means of linearization, offset correction, conversion to a fill height $d_B$-$d_L$. The processed measured value is provided to the outside at an external communication interface 113. In this context any of the established interfaces can be used, in particular 4 . . . 20 mA current interfaces, industrial fieldbuses such as HART, Profibus, FF, or computer interfaces such as RS232, RS485, USB, Ethernet, FireWire.

FIG. 2 again illustrates in detail important steps that in the context of echo signal processing can be applied in the evaluation device 111 for compensating the influences of various media.

Curve 201 in the first instance shows the echo curve 204 acquired by the analog/digital converter unit 110 over time. The echo curve in the first instance contains the component of the transmitting pulse 205 reflected within the antenna. A short time later at the point in time $t_L$ a first echo 206 is acquired, which has been caused by the reflection of signal components from the boundary surface 105 or surface 105 of the medium 106 in the container. A further echo 207 arises as the first multiple echo of the feed material echo 206; it is acquired at the point in time $t_{ML}$. After the signal components penetrating the medium 106 have moved through the feed material 106, they are reflected from the container bottom 108 and generate a further echo 208 within the echo curve 204. This bottom echo 208 is acquired at the point in time $t_B$. Furthermore, at the point in time $t_{MB}$ a multiple echo 209 of the bottom echo may be acquired.

In a first process step the time-dependent curve 201 is transformed to a distance-dependent curve 202. During this transformation it is assumed that the acquired curve has formed exclusively as a result of propagation in a vacuum. The ordinate of the diagram 201 is converted to a distance axis by multiplication with the speed of light in a vacuum. Furthermore, by applying an offset a situation is achieved in which the echo 205 caused by the antenna 104 obtains a distance value of 0 m. Furthermore, the distance values are multiplied by the factor of 0.5 to compensate for the double path to the feed material surface and back.

The second diagram 202 shows the echo curve as a function of the electrical distance D. The electrical distance corresponds to half the distance covered by an electromagnetic wave in a vacuum in a defined period of time. The electrical distance does not take into account any influences of a medium, which influences may result in a slowdown in the propagation of the electromagnetic waves. Curve 202 thus represents a non-compensated-for echo curve which is, however, related to locations.

In this document the electrical distances are always designated by the upper case letter D, whereas physical distances, which can be directly measured on the container, are designated by the lower case letter d.

Furthermore, it may be possible to fully compensate the echo curve 210. The third diagram 203 shows a fully-compensated echo curve 211. In order to obtain a diagram of the echoes over the physical distance, in the present case the influence of the overlay medium 107 in the region between the locations 0 and $D_L$ (curve 202) need to be taken into account. The electrical distance values of the abscissa between 0 and $D_L$ need to be converted to physical distance values according to the following correlation:

$$d_i = \frac{D_i}{\sqrt{\varepsilon_L \cdot \mu_L}}$$

Since $\varepsilon_{Luft}\varepsilon_L$ and $\mu_{Luft}\mu_L$ for air in good approximation correspond to the value 1, no correction needs to take place in relation to this section in the present example. However, the electrical distance values of the abscissa greater than or equal to $D_L$ need to be converted to physical distance values according to the following correlation:

$$d_i = d_L + \frac{(D_i - D_L)}{\sqrt{\varepsilon_M \cdot \mu_M}}$$

The third diagram 203 finally shows the corrected curve. Both the distance to the echo 206 of the feed material surface 105 and the distance to the echo 208 generated by the container bottom 108 agree with the distances that can be measured on the container 109. The distance to the multiple echo 207 of the feed material surface cannot be measured directly on the container because the above compensation applies only to direct reflections. The same applies to the multiple echo 209 of the reflection on the container bottom 108.

At this stage it should be pointed out that the conversion in curve 202, in other words determining the electrical distances of various echoes, in the context of signal processing can preferably be carried out in the device in relation to all the echoes. Generally-speaking, conversion of the echo curve to a compensated echo curve is not carried out, because correction of an individual distance value to the feed material surface is sufficient.

FIG. 3 illustrates the use of an indirect or direct determination of the position of the feed material surface by means of a bottom echo. The container 301 shown is almost completely full of feed material 302. In contrast to the container 109 of FIG. 1, the fill-level measuring device 101 in the container 301 of FIG. 3 may be installed so as to be in a dome shaft 303. A dome shaft may be a shaft by way of which the tank can be filled. A dome shaft may also be implemented by an access option for service personnel, a so-called manhole. Furthermore, it may also be possible to use a dome shaft for other purposes. In the so-called dome at the apex of the tanks, among other things the fill-level measuring device can be in place.

Apart from the echo 305 generated by the antenna 104, the echo curve 304 acquired by the fill-level measuring device 101 comprises only one multiple reflection $E_{ML1}$ 306 from the feed material surface 307 and the bottom echo 309 generated by the container bottom 308. The echo generated by the surface 307 of the medium cannot reliably be detected by the acquired echo curve 304 since in the region of influence of the antenna echo 305 said echo is completely covered by said antenna echo 305. The distance $d_L$ to the feed material surface cannot be determined in a conventional manner.

The position of the feed material surface can be measured indirectly so that the position $d_L$ of the feed material surface can be determined according to the following equation from the electrical distance $D_B$ of the bottom echo:

$$d_L = \frac{d_B \cdot \sqrt{\varepsilon_M \cdot \mu_M} - D_B}{\sqrt{\varepsilon_M \cdot \mu_M} - \sqrt{\varepsilon_L \cdot \mu_L}}$$

In a multitude of practical applications, because of the high loss values of the signals in the medium, the bottom echo 309 in the echo curve can no longer be detected.

Furthermore, from the position of a multiple echo $E_{ML1}$ 306 it is possible to deduce the position $d_L$ of the feed material surface:

$$d_L = \frac{D_{ML1} + \sqrt{\varepsilon_L \cdot \mu_L} \cdot N \cdot d_D}{(1+N) \cdot \sqrt{\varepsilon_L \cdot \mu_L}}$$

wherein N denotes the order of the multiple echo at the distance $D_{ML1}$.

Moreover, multiple echoes and bottom echoes can be detected in that the speed values and/or the positions of several echoes of an echo curve can be analyzed.

A knowledge of the permittivity values and permeability values of the media contained in the container 301, as well as a knowledge of the geometric dimensions of the container, in particular of the length of the dome shaft $d_D$ and of the expanded container height $d_B$ or of the container height $d_b$-$d_D$, is a basic prerequisite for carrying out indirect measuring.

FIG. 4 illustrates the physical correlations that may give rise to the formation of multiple echoes.

The fill-level measuring device 401 generates an electromagnetic pulse 402 according to known methods and emits this pulse 402 in the direction of the feed material surface 105 to be measured. The signal arrow 403 indicates the propagation of the signal as a function of the physical distance over time. Part of the transmit signal is reflected from the surface of the feed material 105 and after a corresponding transit time returns to the fill-level measuring device. The signal path 404 illustrates this propagation path. Based on the received signals, the fill-level measuring device forms an echo curve 204 which, due to the signal paths 403 and 404, comprises a first echo $E_L$ 206. A component of the signals is reflected anew, for example from the container ceiling 405 or from the fill-level measuring device 401, and propagates in the direction of the feed material surface 105, which is indicated by the signal arrow 406. This signal component is again reflected from the feed material surface, and after a corresponding transit time returns to the fill-level measuring device 401, where it is acquired as the first multiple echo $E_{ML1}$ 207 of the feed material reflection and is depicted in the echo curve 204; signal path 407 illustrates the process.

Part of the radiated signal energy 402, which part is not reflected from the feed material surface 105, penetrates the medium 106 and within it continues to propagate 408 at reduced speed in the direction of the container bottom 108. At the container bottom the signal is reflected and after a corresponding transit time returns to the fill-level measuring device. The signal paths 409 and 410 illustrate the propagation of the signal on this path. It should be noted that the signal propagates at different speeds in the various media, which in the signal path diagram is evident by the different gradients of the signal paths 409, 410. The fill-level measuring device receives the signal components reflected from the container bottom and depicts them in the form of a bottom echo $E_B$ 208 in the echo curve 204. Analogous to the formation of multiple echoes 207, 415 of the feed material reflection, under favorable conditions the formation of one or several multiple echoes of the bottom echo can also be observed. The signal paths 411, 412, 413, 414 illustrate the formation of a first multiple echo $E_{MB}$ 209 of the bottom echo $E_B$ 208, which after a corresponding transit time also forms in the echo curve 204 received by the fill level measuring device.

In principle it is possible to construct higher-order multiple echoes. With regard to this the signal path diagram shows the signal paths 417 and 418 that are suitable to generate a second-order multiple echo $E_{ML2}$ 415 relative to the reflection from the feed material surface. Corresponding higher-order multiple echoes are also possible in relation to the reflection from the container bottom. The average person skilled in the art may not encounter any problems in transposing the aspects of the present invention, which aspects are hereinafter presented by means of the multiple echoes of the first order, to higher-order multiple echoes. The order of a multiple echo is defined as the number of reflections of an emitted signal from a media surface of a feed material to be measured in the container, reduced by 1. According to this nomenclature, the echo $E_L$ is identical to a multiple echo of the order of 0, whereas the echo $E_{ML1}$ is identical to a multiple echo of the first order.

Furthermore, mixed signal paths are also imaginable that lead to further echoes within the received echo curves. Thus it may, for example, be possible for the signal, after passing along the signal path 406, to penetrate the medium and to propagate in the direction of the container bottom. Furthermore, it may, for example, also be possible for part of the signal energy, after passing along the signal path 411, to be reflected from the feed material surface, and to propagate again directly in the direction of the fill-level measuring device. In the context of the present invention, mixed signal paths should not be further considered because in practical application they are almost irrelevant. However, the average person skilled in the art may not encounter any problems in transposing the aspects of the present invention, which aspects are hereinafter presented by means of the multiple echoes of the first order, to mixed multiple echoes. In the present context mixed echoes are defined as echoes of an echo curve that are caused by signal paths within which a signal generated by the fill-level measuring device is reflected from at least two different boundary surfaces of at least one feed material to be measured in a container. The present example does not contain a mixed multiple echo.

Consideration can be less extensive with the use of a fill-level measuring device in a container with a dome shaft in place. FIG. 5 shows an example of the use of the measuring device 401 according to the invention in such a container 501. The fill-level measuring device is not installed directly at the height of the container ceiling 502; instead, it is situated in a dome shaft 503 which, in contrast to the example of FIG. 4, in FIG. 5 comprises a physical length of $d_D>0$. The installation position of the fill-level measuring device in the dome shaft massively influences the formation of multiple echoes. The signal path diagram 504 illustrates the formation of multiple echoes in the present case. The signal generated by the fill-level measuring device in the first instance propagates through the dome shaft 503 and the actual container to the surface of the medium 505. Signal path 506 illustrates this signal path. The medium reflects the signal, whereupon said signal propagates in the direction of the fill-level measuring device 401. Since the opening 513 of the dome shaft 503 is small in relation to the container ceiling 502, only a very small part of the signal is shown as a fill level echo $E_L$ 515 in the echo curve 514.

The signal paths 507 and 508 illustrate this propagation path. By far the larger part of the signal energy is reflected from the container ceiling (signal path 509), and reaches the feed material surface again. In this manner, after the signal has passed along the signal paths 509, 510, and 511, a first multiple echo $E_{ML}$ 516 is shown in the echo curve. The interrelations presented in the context of dome shafts correspondingly also apply to the higher-order multiple echoes, which is indicated by the signal path 512; said interrelations also apply to the multiple echoes of the bottom reflection.

Figure 6:
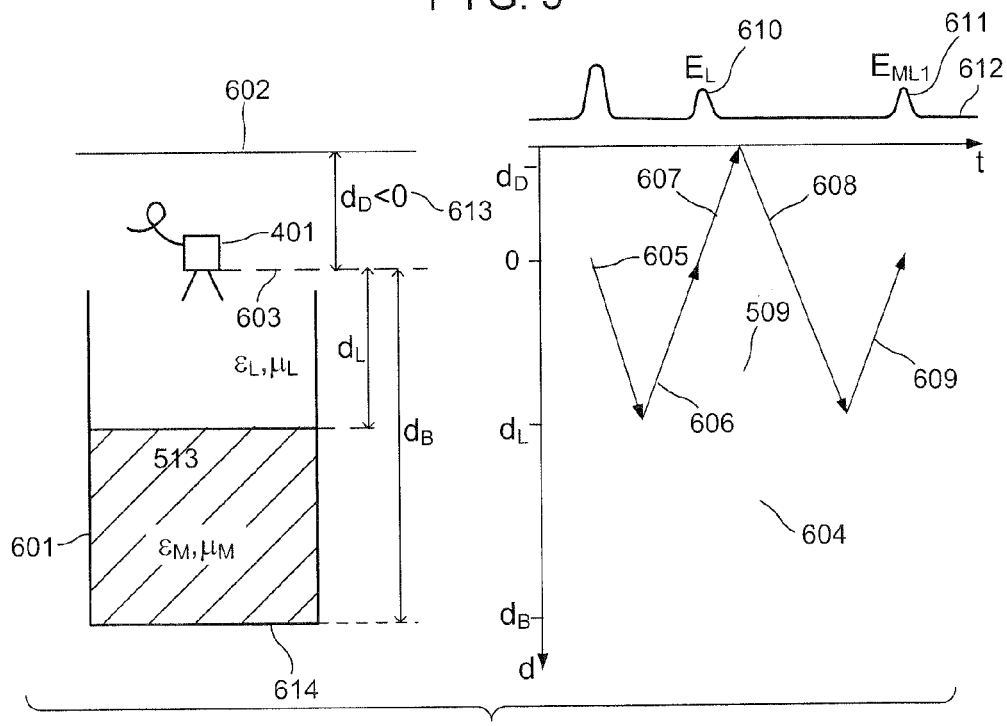
FIG. 6 shows an example of fill level measuring without a container cover.

Moreover, in industrial applications there are also constellations which with the introduction of a negative length of the dome shaft can be processed in an advantageous manner. FIG. 6 shows such an application case. The fill-level measuring device 401 is installed above an open-top container 60, wherein the entire measuring arrangement is, for example, situated in a hall so that there may be a metallic flat roof 602 above the arrangement. In the course of signal processing of the fill-level measuring device 401, the space between the reference plane 603 of the fill-level measuring device 401 and the hall roof 602 is taken into account as a negative length of the dome shaft with a physical length of $d_D>0$. Thus, in the context of the present invention the application may comprise a dome shaft, wherein the latter may comprise a negative length. When measuring is subsequently carried out by the fill-level measuring device 401, signal paths as shown in the signal path diagram 604 result. The direct reflection from the feed material surface, which is illustrated by the signal paths 605 and 606, is shown in the echo curve as a fill level echo $E_L$ 610. However, by far the greater part of the signal energy propagates as far as the hall roof 602, is reflected by the aforesaid, and after renewed reflection from the feed material surface leads to the first multiple echo $E_{ML}$ 611 within the echo curve 612. The signal propagation that results in this echo is indicated by the signal paths 607, 608 and 609.

In practical application the interrelationships described above can lead to problems when measuring the fill level, in particular in the case of indirect measuring. The demonstrated methods for indirectly determining the position of a feed material according to FIG. 3 require a precise knowledge of some container characteristics such as the container height or the length of the dome shaft, and moreover the information relating to the permeability values and permittivity values of the media contained in the container.

Apart from manual input of the required parameters by the user, various methods for determining the values can be used.

Many of these methods determine the permittivity of a medium from the positions, which have been determined by measurement, of the feed material reflection and of the bottom reflection. This approach is associated with disadvantages in that it is necessary to know in advance the height of the container and if applicable also the height of a dome shaft. Furthermore, the determination is associated with considerable inaccuracies because the individual values, which have been determined by measurement, can become falsified by the effects of noise.

Furthermore, automated determination of the container height is only possible if, apart from the permittivity of the media in the container, the length of a possibly present dome shaft is also known in advance.

Attempts at determining the permittivity by means of an echo amplitude can be unreliable in practical application, because the amplitude of an echo can be massively compromised by layers in the case of bulk materials, and by foam in the case of liquids.

Many attempts at determining media characteristics and container characteristics thus do not provide robust methods which in the context of fill level measuring under real-life conditions would result in improvements. Furthermore, by means of the above-mentioned methods it is not possible to carry out automatic determination of the parameters in the context of interface measuring.

Figure 7:
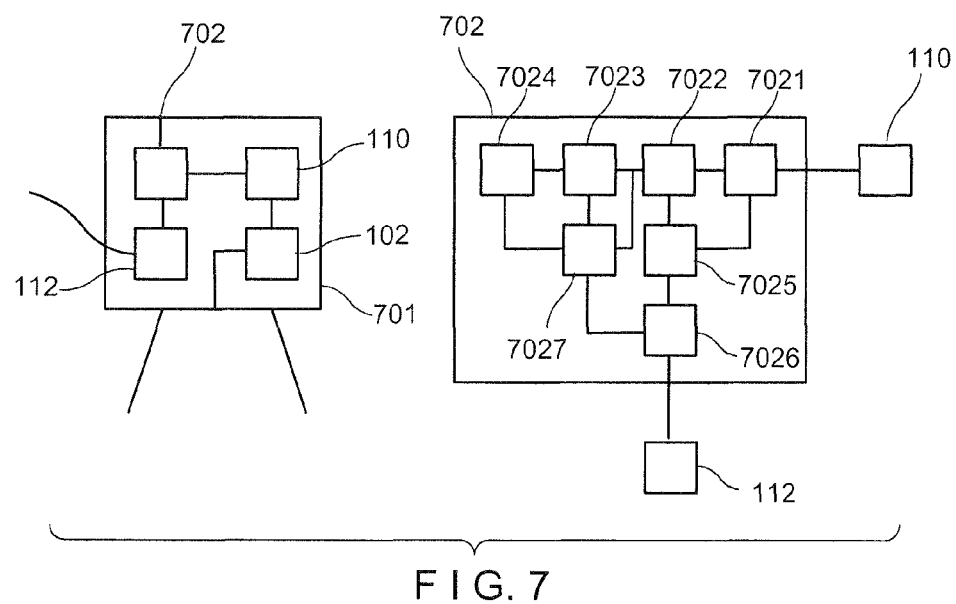
FIG. 7 shows a fill-level measuring device according to an exemplary embodiment of the invention.

The block diagram of FIG. 7 shows an example of a fill-level measuring device and a device for determining media characteristics and container characteristics according to an exemplary embodiment of the invention.

The fill-level measuring device 701 largely corresponds to the fill-level measuring device 101 shown in FIG. 1, but it differs from the devices used so far by a modified evaluation device 702.

The evaluation device 702 may comprise, or consist of, an echo identification device 7021, a tracking device 7022, a speed determination device 7023, a multiple-echo and bottom-echo detection device 7024, a decision-making device 7025, an echo measuring device 7026, as well as a self-learn device 7027.

The echo identification device 7021 examines the echo curve, which has been conveyed by the echo-curve acquisition device 102, 110 for echoes 205, 206, 207, 208, 209 contained in said curve. The tracking device 7022 undertakes grouping of echoes from various measuring cycles in such a manner that echoes caused by the same reflection location in the container, and which echoes arise on the basis of identical signal paths, are aggregated to form groups. On the basis of these groups, which are also referred to as "tracks" it is possible, for example, to reliably determine the speed of an echo. The speed determination device 7023 determines at least one key figure relating to the speed of the echoes of the then current echo curve. The multiple-echo and bottom-echo detection device 7024 classifies multiple echoes and bottom echoes.

On the basis of the identified echoes, tracks and of the classification, undertaken according to bottom echoes and multiple echoes, the self-learn device 7027 may be in a position to automatically learn media characteristics and container characteristics. On the basis of all the values determined so far, the decision-making device 7025 may make a decision as to which echo of the echo curve was generated by the feed material reflection. With reference to the echo measuring device 7026 the precise position of the echo can be determined, for example with the use of automatically acquired characteristic values of a medium or of a container in the context of indirect measuring. Furthermore, influences of an overlay medium can be compensated for.

Figure 8:
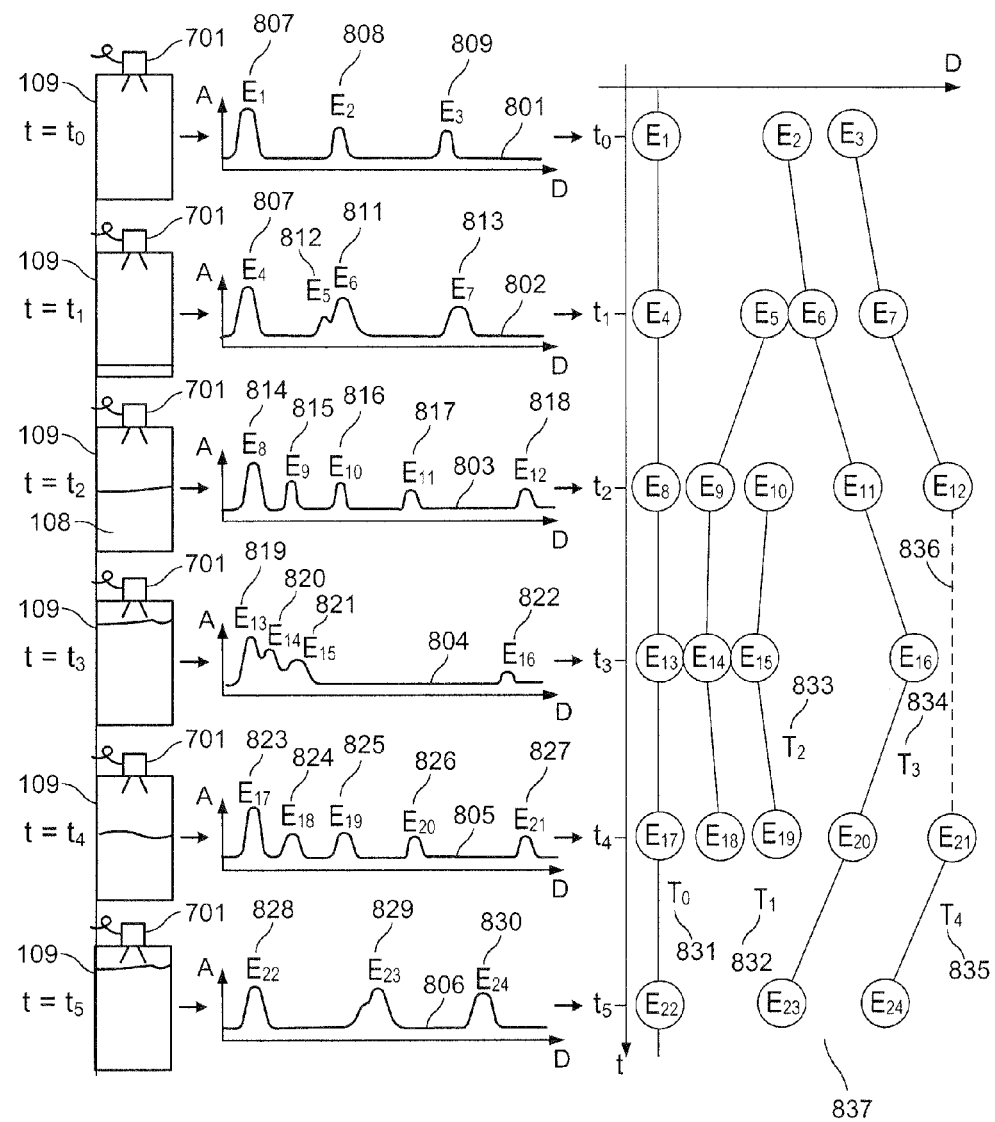
FIG. 8 shows measuring cycles with a fill-level measuring device according to an exemplary embodiment of the invention.

The diagrams of FIG. 8 show a sequence of measuring cycles as they could be carried out with a measuring device 701 according to the invention. At consecutive points in time $t_0 < t_1 < t_2 < t_3 < t_4 < t_5$ the container 109 to be monitored is first filled with a medium 106 and subsequently emptied again. The echo curves 801, 802, 803, 804, 805, 806 acquired at the respective points in time by a fill-level measuring device 701 according to the invention are charted directly beside the diagram of the container at the respective point in time.

Apart from the antenna echo $E_1$, the echo curve 801 of the empty container 109 comprises 807 only an echo $E_2$ 808, caused by the bottom, and a further multiple echo $E_3$ 809 of the bottom reflection. These echoes are acquired by the echo identification device, wherein at this point in time no classification of the echoes has taken place yet. The echoes are therefore preferably provided with different indices so that they can be algorithmically further processed.

On the basis of the identified echoes $E_1$ 807, $E_2$ 808 and $E_3$ 809, in a further process step the tracking device 7022 attempts to place the identified echoes in a logical context with echoes already identified earlier. Disclosures relating to the implementation of a tracking method in the context of fill-level measuring technology are provided, for example, in WO 2009/037000. The tracking device 7022 of the fill-level measuring device 701 may initialize a first track $T_0$ 831 on the basis of the antenna reflection $E_1$.

Furthermore, a track $T_3$ 834 for tracing the bottom echo $E_2$ 808 and a track $T_4$ 835 for tracing the multiple echo $E_3$ 809 at the point in time t=$t_0$ may be initialized.

At the point in time t=$t_1$ the container may be slightly filled. The echo curve 802 acquired by the fill-level measuring device is shown in FIG. 8. The tracking unit of the fill-level measuring device 701 continues the already commenced tracks $T_0$ 831, $T_3$ 834 and $T_4$ 835 with the echoes of the then current measurement, which echoes originate from the same reflection location in the container. Furthermore, for monitoring the newly-added fill level echo $E_5$ 812 a new track $T_1$ 832 is initialized.

In the further course of time the container is increasingly filled. At the point in time t=$t_2$ the container may thus be half full. Corresponding to the explanations provided in the context of FIG. 2, at this state both a multiple reflection $E_{10}$ 816 of the feed material surface and a multiple reflection $E_{12}$ 818 of the container bottom is shown in the acquired echo curve 80. The newly added multiple reflection from the feed material surface results in re-initialization of a track $T_2$ 833, whereas the already existing tracks $T_0$ 831, $T_1$ 832, $T_3$ 834 and $T_4$ 835 are continued with the echoes of the correspondingly identical reflection position in the container.

The container, which is almost entirely full of medium 106, is shown at the point in time t=$t_3$.

On the basis of the very considerable loss of the measuring signals used by the fill-level measuring device 701 within the medium 106 it may now no longer be possible to acquire the first multiple reflection from the container bottom. However, the tracking method is in a position to take into account the absence of this echo, for example by inserting an invisible section 836 within the track $T_4$ 835. The other tracks are expanded by the acquired echoes of the echo curve 804 according to the above description.

During subsequent emptying of the container the first multiple reflection $E_{21}$ 827 of the container bottom makes a reappearance at the point in time t=$t_4$. The associated track $T_4$ 835 is continued again with the multiple echo of the bottom reflection. Furthermore, the existing tracks are expanded in the known manner.

For each of the measuring cycles carried out at the points in time $t_0 < t_1 < t_2 < t_3 < t_4 < t_5$, a track list is present in the sensor, which track list is provided by the tracking device 7022, and which track list describes the then current tracks 83 at the respective point in time. The track list may, for example, comprise vectors that in relation to each track describe the locations of the respectively associated echo. However, it may also be possible to use a memory-optimized representation as shown, for example, in EP 2 309 235 A1. The method proposed therein also provides an option of dividing a track, in other words a sequence of echoes with an identical reflection origin, into sections of time in which the associated echo comprises an almost constant speed.

In the context of further signal processing, preferably on the basis of the tracks 831, 832, 833, 834, 835, an analysis for multiple echoes and bottom echoes is carried out. This may result in a classification of the acquired echoes in such a manner that the echoes of the tracks $T_2$ 833 are multiple echoes of the respective echoes of the track $T_1$ 832, because track $T_2$ moves consistently in the same direction as track $T_1$. Furthermore, the multiple-echo and bottom-echo detection device 7024 may classify that the echoes of the track $T_3$ describe the bottom of the container, because they move in a push-pull manner in relation to the direction of movement of the fill level echoes of the track $T_1$.

Self-Learning the Permittivity Value of the Medium:

With the use of the information of an acquired fill level track $T_1$ 832, which groups reflections from the feed material surface, and of an associated bottom track $T_3$ 834, which is classified as such, which bottom track $T_3$ 834 groups reflections from the container bottom, according to the invention the self-learn device 7027 can deduce the relationship of the characteristics of the medium 106 to that of the overlay atmosphere 107:

$$\frac{\varepsilon_M \cdot \mu_M}{\varepsilon_L \cdot \mu_L} = \left(1 + \left|\frac{V_B}{V_L}\right|\right)^2$$

wherein $\varepsilon_M$ and $\varepsilon_L$ denote the permittivity values of the medium and of the overlay atmosphere, and $\mu_M$ and $\mu_L$ denote the permeability values of the medium and of the overlay atmosphere. Furthermore, $V_B$ denotes the speed of a bottom reflection or of a bottom echo, and $V_L$ denotes the speed of a feed material reflection or of a feed material echo or of a fill level echo.

The speeds of the respective echoes can be determined by means of the local gradient of the associated tracks $T_1$ 832 and $T_3$ (834).

As an alternative, the speed $V_E$ of an echo, of a track, or of a reflection can be determined, according to the following equation, from a position shift of the echo, track or the reflection between two different measuring cycles of the fill-level measuring device:

$$V_E = \frac{D_E(t_2) - D_E(t_1)}{t_2 - t_1}$$

wherein the following apply:
$D_E(t_2)$ electrical distance to the echo, track or the reflection in measuring cycle 2)
$D_E(t_1)$ electrical distance to the echo, track or the reflection in measuring cycle 1
$t_2$ point in time at which measuring cycle 2 is carried out
$t_1$ point in time at which measuring cycle 1 is carried out.

With the application of regression methods it is also possible to use several positions of the echoes of a track to determine the speed of an echo. However, it may also be possible to determine the speed relating to entire sections of a track in which the speed of the echoes is almost constant. The method described in EP 2 309 235 A1 can be used to transform a track into sections of constant speeds. Furthermore, it may be possible to determine the speed from a Doppler analysis of the echoes.

Since in a multitude of applications the overlay atmosphere is represented by air, the above correlation can approximately be used for direct acquisition of the media characteristics of the feed material:

$$\varepsilon_M \cdot \mu_M = \left(1 + \left|\frac{V_B}{V_L}\right|\right)^2$$

At this stage it should be pointed out that in contrast to hitherto-used methods, no information whatsoever relating to the height of the container or the length of the dome shaft is required for determining the media characteristics. Furthermore, the above correlations can also be derived by means of the speed ratios of the multiple reflections 833 of the feed material and of the multiple reflections 835 of the container bottom.

Self-learning the length of the dome shaft from the position of two multiple echoes:

With the use of the position of an acquired multiple echo $E_{MLN1}$ 207 of the feed material reflection, which multiple echo $E_{MLN1}$ 207 has been classified as such and is to comprise an electrical distance of $D_{MLN1}$, and with the use of the position of an acquired multiple echo $E_{MLN2}$, which multiple echo $E_{MLN2}$ has been classified as such and comprises an electrical distance of according to the invention the self-learn device 7027 can deduce the length $d_D$ of a dome shaft 503, 613:

$$d_D = \frac{(N_1 + 1) \cdot D_{MN2} - (N_2 + 1) \cdot D_{MN1}}{\sqrt{\varepsilon_L \cdot \mu_L} \cdot (N_1 - N_2)}$$

wherein $N_1$ denotes the order of the multiple echo at the distance $D_{MN1}$ and $N_2$ denotes the order of the multiple echo at the distance $D_{MN2}$. If it is assumed that the feed material echo is a multiple echo of the order of 0 with an electrical distance of $D_L$, then, according to the invention, the self-learn device 7027 can also determine the length of the dome shaft by means of the feed material reflection in conjunction with a further multiple reflection:

$$d_D = \frac{(N_1 + 1) \cdot D_L - D_{MN1}}{\sqrt{\varepsilon_L \cdot \mu_L} \cdot N_1}$$

If it is, furthermore, assumed that air is used as the overlay atmosphere, then in good approximation $\sqrt{\varepsilon_L \cdot \mu_L}=1$ results, and consequently the above equations can be simplified accordingly.

Figure 9:
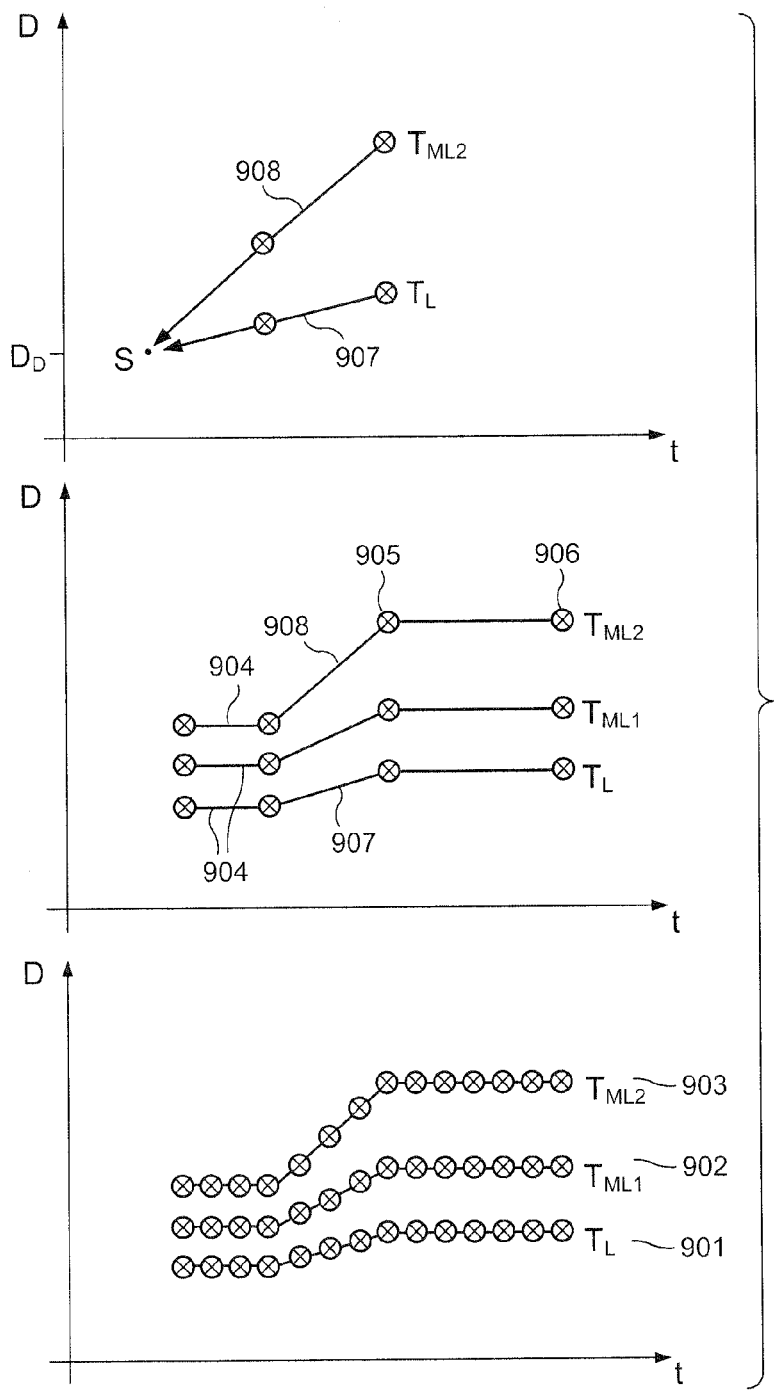
FIG. 9 shows a method for determining a length of the dome shaft according to an exemplary embodiment of the invention.

Self-learning the length of the dome shaft from the intersection of at least two speed vectors of multiple echoes:

FIG. 9 shows an example of a sequence of echoes in a fill level measuring process according to the schematic of the track diagram of FIG. 8. The fill-level measuring device may consecutively identify various echoes that in the diagram may be designated ⊕. The tracking device 7022 groups the received echoes according to their reflection position. The track $T_L$ 901, which groups the echoes of the feed material reflection, the track $T_{ML1}$ 902, which groups the echoes of the first multiple reflection from the feed material surface, and the track $T_{ML2}$ 903, which represents the echoes of the second multiple reflection from the feed material surface, may be formed in this manner.

In a first advantageous process step the tracks may be converted to track segments 904. Formation of the segments takes place in such a manner that measurements in which the echoes of a track move at (approximately) constant speed or with an identical speed vector can be represented in a memory-optimized manner by a mathematical straight line equation or by two supporting points 905, 906. Disclosures for implementing this step are provided, for example, in EP 2 309 235 A1.

On the basis of the segment view of the tracks, by means of the self-learn device 7027 the fill-level measuring device can identify at least one segment pair 907, 908 that is valid in the same time period, which segment pair 907, 908 is caused by the same reflection position in the container, i.e. comprises a multiple-echo relationship, and which at the same time in each case comprises a gradient that is significantly greater than zero. The gradient of a segment may be equivalent to the speed of the echo on which the segment is based.

The identified segment pair 907, 908 is further investigated within the self-learn device. In particular, the mathematical straight line equations of the selected segments are determined in order to, on the basis of these equations, calculate the intersection S of the two straight lines according to known methods.

The distance D at which the two straight lines intersect corresponds to the length of the dome shaft $D_D$ of the container to be measured at that time. With the use of the materials characteristics of the overlay atmosphere, the electrical length of the dome shaft $D_D$ can be converted to the physical length of the dome shaft $d_D$. The following applies:

$$d_D = \frac{D_D}{\sqrt{\varepsilon_L \cdot \mu_L}}$$

If it is assumed that air is the overlay atmosphere, then the electrical length of the dome shaft in good approximation corresponds to the physical length of the dome shaft.

The above representation of a preferred embodiment illustrates the functionality of the method by means of forming a track and track segments. Fundamentally, the principle of the disclosed invention can also be implemented by means of individual echoes that have been recognized by a classification device as being multiple echoes. The mathematical straight line equations describe the then current speed vector of the respective echoes, and in this case are defined in that the straight lines must lead through the then current point of the respective echo, which point may be defined by the respective position and the then current point in time. Furthermore, the gradient of the respective straight line is identical to the then current speed of the respective echo. The straight line equations are thus precisely defined and make it possible to achieve the mathematical calculation of the intersection S as already disclosed above.

The speed of an echo can easily be determined by means of the local gradient of the associated tracks. As an alternative, the speed can be determined from a position shift of the echoes of a track. By applying regression methods it is also possible to use several positions of the echoes of a track in order to determine the speed of an echo. However, it may also be possible to determine the speed relating to entire sections of a track in which the speed of the echoes is almost constant. Furthermore, it may be possible to determine the speed from a Doppler analysis of the echoes.

At this stage it should be pointed out that it may not matter which multiple echoes are used for the above-mentioned calculation. It is, in particular, also possible to determine the intersection S by means of a straight line 907, or of a speed vector of the feed material echo and a straight line 908, or of a speed vector of a multiple reflection from the feed material surface. Furthermore, it may be possible to determine the intersection S by means of a straight line 907 of a first multiple reflection of the order N1 and of a straight line 908 of a further multiple reflection of the order N2 from the feed material surface. Moreover, in order to improve the accuracy or for plausibility checks it may be possible to calculate a multitude of intersections of different multiple reflections, and to statistically evaluate the positions of the aforesaid, for example by averaging or variance analyses.

Figure 10:
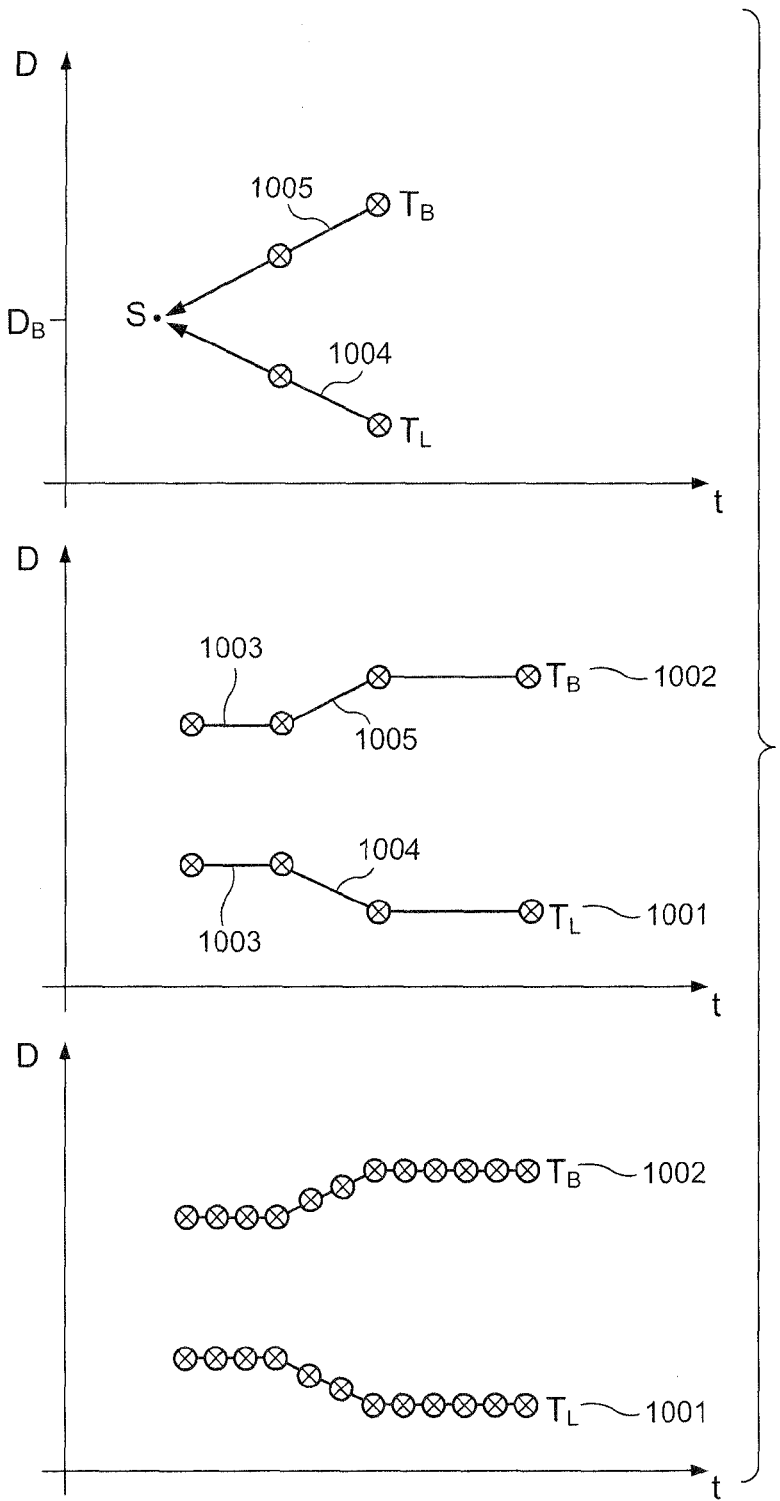
FIG. 10 shows a method for determining the container height according to an exemplary embodiment of the invention.

Self-learning the container height from the intersection of at least one speed vector of a feed material echo and of at least one speed vector of a bottom echo:

FIG. 10 again shows an example of a sequence of echoes in a fill-level measuring process according to the schematic of the track diagram of FIG. 8. The fill-level measuring device according to the invention may consecutively identify various echoes that in the diagram may be designated ⊕. The tracking device 7022 groups the received echoes according to their reflection position. The track $T_L$ 1001, which groups the echoes of the feed material reflections, and the track $T_B$ 1002, which represents the echoes of the reflection from the container bottom, may be formed in this manner.

In a first advantageous processing step the tracks may be converted to track segments 1003. Formation of the segments takes place in such a manner that measurements in which the echoes of a track move at (approximately) constant speed or with an identical speed vector can be represented in a memory-optimized manner by a mathematical straight line equation or by two supporting points 905, 90. Disclosures for implementing this step are provided, for example, in EP 2 309 235 A1.

On the basis of the segment view of the tracks, by means of the self-learn device 7027 a fill-level measuring device according to the invention can identify at least one segment pair 1004, 100 that occurs at the same time and that in each case comprises a significant gradient greater than zero. Furthermore, precisely one 100 of the identified segments must be caused by a reflection from the feed material surface 20, and a further segment must be caused by a reflection from the container bottom 20.

The identified segment pair 1004, 1005 is further investigated within the self-learn device. In particular, the mathematical straight line equation of the selected segments is determined in order to, on the basis of these equations, calculate the intersection S of the two straight lines according to known methods.

The distance D at which the two straight lines intersect corresponds to the height $D_B$ of the container to be measured at that time. With the use of the materials characteristics of the overlay atmosphere, the electrical distance to the container bottom $D_E$ can be converted to the physical distance to the container bottom $d_B$. The following applies:

$$d_B = \frac{D_B}{\sqrt{\varepsilon_L \cdot \mu_L}}$$

If it is assumed that air is the overlay atmosphere, then the electrical distance to the container bottom in good approximation corresponds to the physical distance to the container bottom.

The above representation of a preferred embodiment illustrates the functionality of the method by means of forming a track and track segments. Fundamentally, the principle of the disclosed invention can also be implemented by means of individual echoes that have been recognized by a classification device as being a fill level echo or a bottom echo. In this case the mathematical straight line equations are defined in that the straight lines must lead through the then current point of the respective echo, which point may be defined by the respective position and the then current point in time. Furthermore, the gradient of the respective straight line is identical to the then current speed of the respective echo. The straight line equations are thus precisely defined and make it possible to achieve the mathematical calculation of the intersection S as already disclosed above.

The speed of an echo can easily be determined by means of the local gradient of the associated tracks. As an alternative, the speed can be determined from a position shift of two echoes of a track. By applying regression methods it is also possible to use several positions of the echoes of a track in order to determine the speed of an echo. However, it may also be possible to determine the speed relating to entire sections of a track in which the speed of the echoes is almost constant. Furthermore, it may be possible to determine the speed from a Doppler analysis of the echoes.

In addition, at this stage it should be pointed out that it may not matter which pair of a feed material reflection and a bottom reflection is used for the above-mentioned calculation. Furthermore, it may be possible to determine the intersection S by means of a straight line 1005, a first multiple reflection from the container bottom, and a straight line of a further multiple reflection from the container bottom, wherein the order of the multiple reflections differs. Moreover, in order to improve the accuracy or for plausibility checks it may be possible to calculate a multitude of intersections of different multiple reflections from the container bottom, and to statistically evaluate the positions of the aforesaid, for example by averaging or variance analyses.

Figure 11:
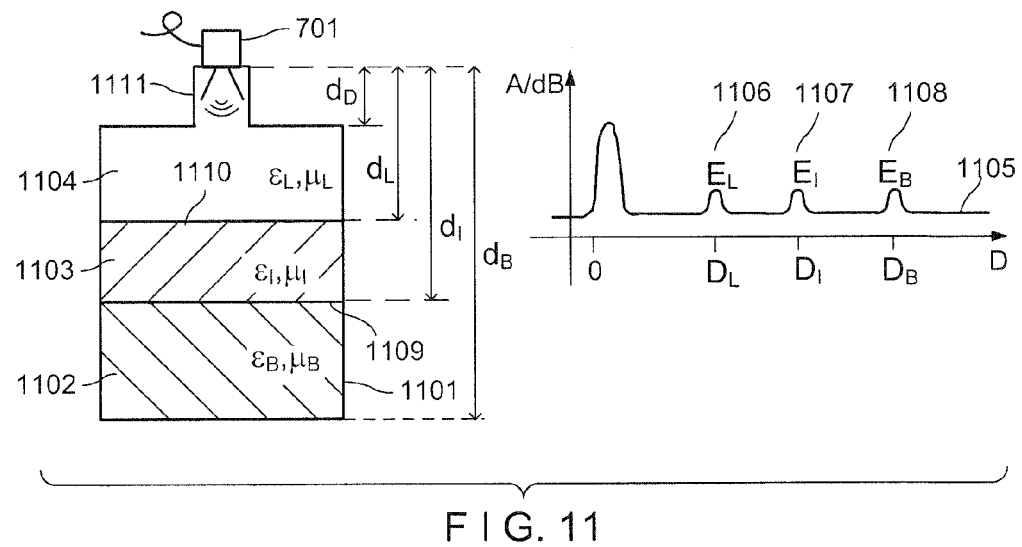
FIG. 11 shows a fill-level measuring device for interface measuring according to an exemplary embodiment of the invention.

Self-learning the permittivity values of several media in interface measuring by means of the speeds of at least two echoes:

Fill level sensors that determine the position of a feed material surface according to a transit time method are increasingly also used for determining the position of an interface. FIG. 11 shows such an application case of a fill-level measuring device. The container 1101 is filled with a lower medium 1102 to a distance $d_I$, wherein the materials characteristics of said medium 1102 may be denoted by $\epsilon_B$ and $\mu_B$. Furthermore, the container 1101 is filled with an upper medium 1103 to a distance $d_L$, wherein the materials characteristics of said medium 1103 are to be characterized by $\epsilon_I$ and $\mu_I$. The overlay atmosphere 1104 may comprise the materials characteristics $\epsilon_L$ and $\mu_L$. Apart from the fill level echo $E_L$ 1106 generated by the upper medium 1103, and the bottom echo $E_B$ 1108 generated by the container bottom, the echo curve 1105 acquired by the fill-level measuring device comprises an interface echo $E_I$ 1107 generated by the interface 1109, which interface echo $E_I$ 1107 may comprise an electrical distance of $D_I$. According to the state of the art the echoes of each acquired echo curve are identified by the echo identification device 7021, whereupon the tracking device 7022 may, for example, establish three tracks. A first track $T_L$ may group the echoes of the feed material surface 1110; a further track $T_I$ may represent the echoes of the interface 1109. Furthermore, a third track $T_B$ may be acquired which aggregates the echoes of the container bottom.

In interface installations, multiple echoes of the feed material surface can be identified according to known methods. The length of the dome shaft 1111 can be determined by an analysis of two multiple reflections from the feed material surface according to the principle presented above. Moreover, in particular measuring situations, it is possible, when taking interface measurements, to obtain knowledge about the characteristics of the lower medium 1102 and about the upper medium 1103.

Figure 12:
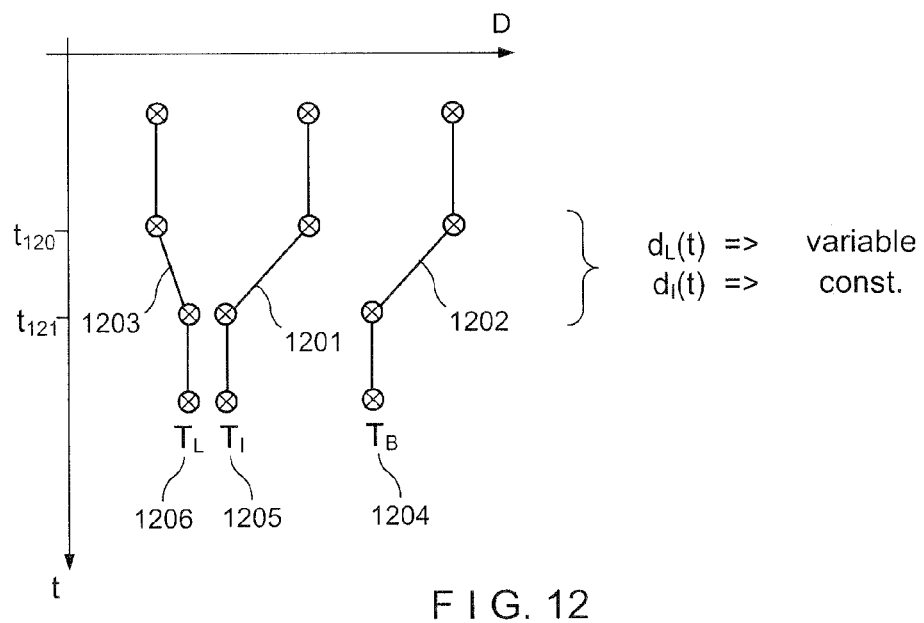
FIG. 12 shows interface measuring with a constant distance to an interface according to an exemplary embodiment of the invention.

With reference to a track diagram, FIG. 12 shows a first special measuring situation that is used by the fill-level measuring device 701 according to the invention, and therein in particular in the self-learn device 7027, in order to gain knowledge about the characteristics of the media in the container.

In the shown period of time between $t=t_{120}$ and $t=t_{121}$ the track $T_I$ of the interface echo 1107 has (approximately) the same gradient as has the track $T_B$ of the bottom echo 1108. In other words, in the period of time under consideration the bottom echo and the interface echo have the same speed. The speed of the echoes can easily be determined by means of one of the methods described above.

From these circumstances the self-learn device 7027 concludes that the physical distance $d_L$ to the feed material surface 1110 changes at that time, whereas the physical distance $d_I$ to the interface surface 1109 remains constant.

In this special situation of a stationary nature of the interface layer, the following correlation can be determined from the then current speed $V_L$ of the feed material reflection 1106, 1206, from the speed $V_I$ of the interface reflection 1107, 1205 and from the speed $V_B$ of the bottom reflection 1108, 1204:

$$\frac{\varepsilon_I \cdot \mu_I}{\varepsilon_L \cdot \mu_L} = \left(1 + \left|\frac{V_I}{V_L}\right|\right)^2 = \left(1 + \left|\frac{V_B}{V_L}\right|\right)^2$$

wherein the following apply:
$\epsilon_I$ permittivity value of the upper medium 1103
$\mu_I$ permeability value of the upper medium 1103
$\epsilon_L$ permittivity value of the overlay atmosphere 1104, and
$\epsilon_L$ permeability value of the overlay atmosphere 1104.

In the often encountered case where the overlay atmosphere consists of air, consequently in good approximation the following applies to the characteristics of the upper medium 1102:

$$\varepsilon_I \cdot \mu_I = \left(1 + \left|\frac{V_I}{V_L}\right|\right)^2 = \left(1 + \left|\frac{V_B}{V_L}\right|\right)^2$$

On the basis of this materials characteristic it is from now on possible to convert the electrical distance $D_I$ of the interface to a physical distance $d_I$.

The required speed values can be determined according to any of the methods described above by means of a correspondingly designed speed determination device 7023. Determining the speed by means of a segment diagram of the tracks, shown in FIG. 12, may be particularly advantageous.

Figure 13:
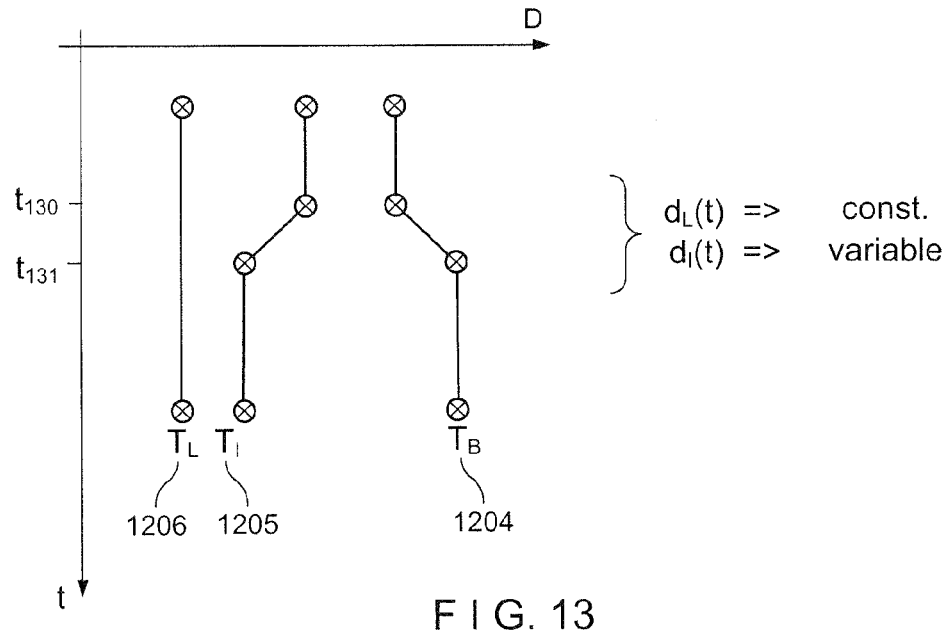
FIG. 13 shows interface measuring with a constant distance to a feed material surface according to an exemplary embodiment of the invention.

By means of a track diagram, FIG. 13 shows a second special measuring situation that is used by the fill-level measuring device 701 according to the invention, and therein in particular in the self-learn device 7027, in order to gain knowledge about the characteristics of the media in the container.

In the shown period of time between $t=t_{130}$ and $t=t_{131}$ the track $T_I$ of the interface echo 1107 has a gradient other than 0. The track $T_B$ of the bottom echo 1108 also comprises a gradient other than 0, whereas the track $T_L$ of the fill level echo 1106 comprises a gradient of (approximately) 0. In other words, in the period of time under consideration the bottom echo and the interface echo show a pronounced movement, i.e. their speed is greater than 0, whereas the speed of the fill level echo is 0. The speed of the echoes can easily be determined by means of one of the methods described above.

From these circumstances the self-learn device 7027 concludes that the physical distance $d_L$ to the feed material surface 1110 does not change at that time, whereas the physical distance $d_I$ to the interface surface 1109 is subject to changes.

In this special situation of a stationary nature of the feed material surface, the following correlation can be determined from the then current speed $V_L$ of the feed material reflection 1106, 1206, from the speed $V_I$ of the interface reflection 1107, 1205, and from the speed $V_B$ of the bottom reflection 1108, 1204:

$$\frac{\varepsilon_B \cdot \mu_B}{\varepsilon_I \cdot \mu_I} = \left(1 + \left|\frac{V_B}{V_I}\right|\right)^2$$

wherein the following apply:
$\epsilon_B$ permittivity value of the lower medium 1102
$\mu_B$ permeability value of the lower medium 1102
$\epsilon_I$ permittivity value of the upper medium 1103, and
$\mu_I$ permeability value of the upper medium 1103.

If the media characteristics $\epsilon_I \mu_I$ of the upper medium have been determined in advance, then it is possible to directly deduce the materials characteristics $\epsilon_B \mu_B$ of the lower medium, with such deduction being independent of the characteristics of the overlay atmosphere.

The required speed values can be determined according to any of the methods described above by means of a correspondingly designed speed determination device 7023.

Determining the speed by means of a segment diagram of the tracks, as shown in FIG. 13, is particularly advantageous.

Figure 14:
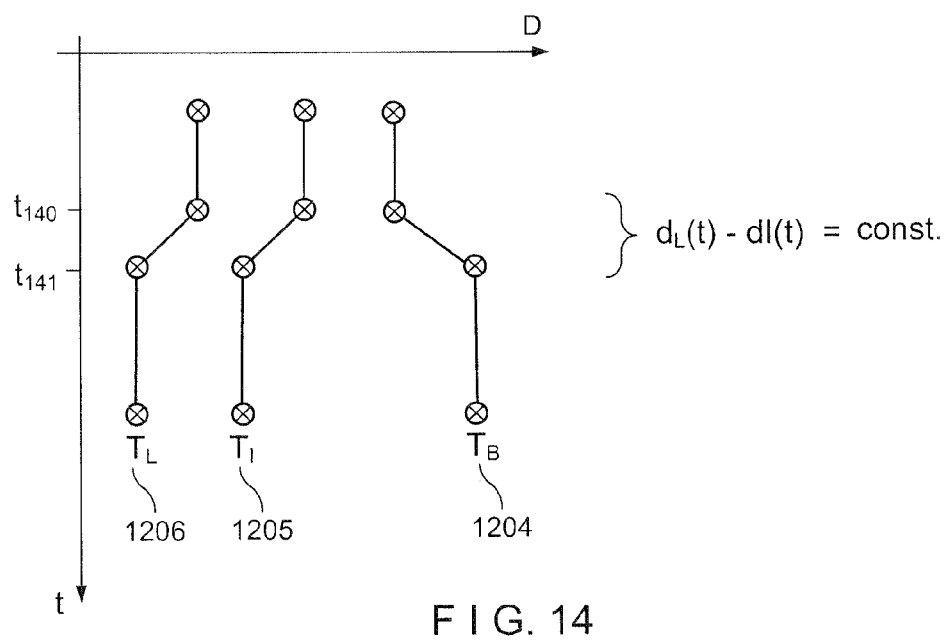
FIG. 14 shows interface measuring with a constant thickness of the upper medium according to an exemplary embodiment of the invention.

Furthermore, by means of a track diagram, FIG. 14 shows a third special measuring situation that is used by the fill-level measuring device 701 according to the invention, and therein in particular in the self-learn device 7027, in order to gain knowledge about the characteristics of the media in the container.

In the shown period of time between $t=t_{140}$ and $t=t_{141}$ the track $T_L$ of the fill level echo 1106 has (approximately) the same gradient as has the track $T_I$ of the interface echo 1107, wherein both tracks have a gradient other than 0. The track $T_B$ of the bottom echo 1108 also comprises a gradient other than 0. In other words, in the period of time under consideration the fill level echo and the interface echo show a pronounced, uniform, movement at the same speed, i.e. they both move at the same speed greater than 0. The speed of the echoes can easily be determined by means of one of the methods described above.

From these circumstances the self-learn device 7027 concludes that the physical thickness of the upper medium remains constant in the period of time under consideration:

$$d_L - d_I = \text{const.}$$

In this special situation of a constant thickness of the upper medium, the following correlation can be determined from the then current speed $V_L$ of the feed material reflection 1106, 1206, from the speed $V_I$ of the interface reflection 1107, 1205, and from the speed $V_B$ of the bottom reflection 1108, 1204:

$$\frac{\varepsilon_B \cdot \mu_B}{\varepsilon_L \cdot \mu_L} = \left(1 + \left|\frac{V_B}{V_L}\right|\right)^2 = \left(1 + \left|\frac{V_B}{V_I}\right|\right)^2$$

In the often encountered case where the overlay atmosphere consists of air, consequently in good approximation the following applies to the characteristics of the upper medium 1102:

$$\varepsilon_B \cdot \mu_B = \left(1 + \left|\frac{V_B}{V_L}\right|\right)^2 = \left(1 + \left|\frac{V_B}{V_I}\right|\right)^2$$

On the basis of this materials characteristic it is from now on possible, by measuring the reflection from the container bottom, to indirectly deduce the position of the feed material surface or the position of the interface surface.

The required speed values can be determined according to any of the methods described above by means of a correspondingly designed speed determination device 7023. Determining the speed by means of a segment diagram of the tracks, as shown in FIG. 14, is particularly advantageous.

Self-learning the permittivity values of several media in interface measuring by means of the positions and the speeds of at least two echoes:

The hitherto disclosed methods for determining media characteristics in interface measuring require at least one of the three constellations, described above, of the special filling or emptying of a container. Moreover, it is, however, also possible, by incorporating the positions of the individual echoes, to derive a generally-valid correlation according to which the media characteristics or materials characteristics of the feed materials 1102, 1103 in a container can be calculated.

Starting from the circumstances as shown in FIG. 11, for interface measurements the following can be derived to be universally valid from the physical principles of the electrical distances and the speeds of the acquired echoes:

$$\varepsilon_I \cdot \mu_I = \left( \frac{V_L - V_I + \frac{D_I - D_L}{D_B - D_I} \cdot (V_B - V_I)}{\left(d_B - \frac{D_L}{\sqrt{\varepsilon_L \cdot \mu_L}}\right) \cdot \frac{V_B - V_I}{D_B - D_I} + \frac{V_L}{\sqrt{\varepsilon_L \cdot \mu_L}}} \right)^2$$

and furthermore:

$$\varepsilon_B \cdot \mu_B = \left( \frac{D_B - D_I}{\left(d_B - \frac{D_I}{\sqrt{\varepsilon_I \cdot \mu_I}}\right) + \frac{\sqrt{\varepsilon_L \cdot \mu_L} - \sqrt{\varepsilon_I \cdot \mu_I}}{\sqrt{\varepsilon_L \cdot \mu_L \cdot \varepsilon_I \cdot \mu_I}} \cdot D_L} \right)^2$$

wherein the following apply:
$\varepsilon_B$ permittivity value of the lower medium 1102
$\mu_B$ permeability value of the lower medium 1102
$\varepsilon_I$ permittivity value of the upper medium 1103
$\mu_I$ permeability value of the upper medium 1103
$\varepsilon_L$ permittivity value of the overlay atmosphere 1104
$\mu_L$ permeability value of the overlay atmosphere 1104
$D_B$ electrical distance to the echo $E_B$ 1108 of the container bottom
$D_I$ electrical distance to the echo $E_I$ 1107 of the interface 1109
$D_L$ electrical distance to the echo $E_L$ 1106 of the surface 1110
$V_B$ speed of the echo $E_B$ 1108 of the container bottom
$V_I$ speed of the echo $E_I$ 1107 of the interface 1109
$V_L$ speed of the echo $E_L$ 1106 of the surface 1110, and
$d_B$ distance from the fill-level measuring device to the container bottom.

The distance $d_B$ from the fill-level measuring device to the container bottom can be entered in the context of initial operation, for example by the customer, and is thus known. Furthermore, in the case of devices operating according to the principle of the guided microwave, this distance corresponds to the length of the cord or of the probe along which the microwaves are guided to the medium, and for this reason the value can already be preset in the factory. Moreover, in a multitude of applications, air is used as the overlay atmosphere, which results in $\sqrt{\varepsilon_L \cdot \mu_L}$ in the above equations being able to be replaced in good approximation by the value of 1.

The required speed values can be determined according to any of the methods described above by means of a correspondingly designed speed determination device 7023. Determining the speed by means of a segment diagram of the tracks, as shown in FIG. 14, is particularly advantageous.

With the use of the above equations it is, for the first time, possible also in interface equipment to automatically acquire the permittivity values and the permeability values of the media contained in the container by means of a single transit time measurement. From now on the values can be used for converting the electrical distances to the associated physical distances. Furthermore, indirect measurement of the fill level is possible with a knowledge of the materials characteristics.

In the present invention different methods for determining container characteristics and/or media characteristics with the use of a fill-level measuring device according to the invention are presented. Many methods share the common feature of classification or evaluation of echoes as multiple echoes or bottom echoes having to be carried out in advance. After this classification has been carried out, predominantly with the use of the speeds of individual echoes or a group of echoes, characteristic values of the container and/or of the media contained therein can be derived. In this context it is possible for the determination of the speed of an echo to take place in various ways, in particular according to the methods described in this disclosure.

Furthermore, it should be noted that the present technical teaching is equally suited to fill level measuring according to the FMCW principle as it is to fill level measuring according to the principle of the guided microwave, the ultrasound principle, the laser principle, or any other transit time method.

In the present description it is assumed that the analysis of the media characteristics can only provide the product of the permeability value and of the permittivity value of the medium in question. Since for the majority of media in good approximation the permeability value can be set to one, all the methods described can in good approximation also be used for directly acquiring the permittivity value of a medium.

Furthermore, determining the length of the dome shaft and of the container height is described. At this stage it should be pointed out that within signal processing of the sensor, both values can be slightly different from the physical values that can be checked by measuring. For one thing the zero point of the sensor can be changed by parameterization. Furthermore, for example, the height of a container in one application including a dome shaft installed thereon can be defined, while in other applications, for example in the case of a negative length of the dome shaft, this definition may not make sense in this manner. Thus, in the context of the present invention, numeric values should be defined that have some relationship with the physical values, and by means of which numerical values special methods, in particular indirect measuring of the feed material layer, can be implemented.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A fill-level measuring device for determining a position of a fill level of at least one of (a) a feed material and (b) an interface between two feed materials in a container using electromagnetic or acoustic waves which are emitted in a direction of a surface of at least one of the feed material and the interface, comprising:
   an echo-curve acquisition device configured to acquire at least one echo curve from reflections of the waves;
   an echo identification device configured to evaluate the at least one echo curve;
   a multiple-echo detection device configured to classify at least one echo of a multiple reflection from at least one of (a) a feed material surface and (b) a bottom of the container as a multiple echo; and
   a self-learn device configured to automatically determine a length of a dome shaft of a dome arranged in an apex region of the container with the use of at least two multiple echoes classified by the multiple-echo detection device.

2. The device of claim 1, further comprising:
   a position determination device;
   wherein the echo identification device is configured to identify a plurality of echoes in the echo curve;
   wherein the multiple-echo detection device is configured to classify at least two of the echoes as multiple echoes;
   wherein the position determination device is configured to determine positions of the at least two multiple echoes; and
   wherein the self-learn device is configured to determine the length of the dome shaft by calculating the positions of the at least two multiple echoes.

3. The device of claim 2, wherein the self-learn device is configured to determine the length of the dome shaft as a function of the order of the at least two multiple echoes.

4. The device of claim 1, wherein the echo identification device is configured to identify a plurality of echoes in the echo curve;
   wherein the multiple-echo detection device is configured to classify two of the echoes as multiple echoes;
   wherein the device is further configured to (a) group echoes of a first multiple echo and a second multiple echo into first and second tracks; (b) convert the tracks into track segments; and (c) identify a segment pair caused by the same reflection position in the container; and
   wherein the device further comprises:
   a speed determination device configured to determine at least two speed vectors of the at least two multiple echoes; and
   wherein the self-learn device is configured to determine the length of the dome shaft by calculating an intersection of at least two speed vectors of the at least two multiple echoes as a function of straight-line equations of the identified segment pair.

5. A method for determining, in a container, a position of a fill level in the container of at least one of (a) a feed material and (b) an interface between two feed materials, comprising the steps of:
   acquiring, using an echo-curve acquisition device, at least one echo curve from reflections of electromagnetic or acoustic waves, the waves emitted in a direction of a surface of at least one of the feed material and the interface;
   evaluating, using an echo identification device, the at least one echo curve;
   classifying, using a multiple-echo detection device, at least one echo of a multiple reflection from at least one of (a) the feed material surface and (b) a bottom of the container as a multiple echo; and
   automatically determining, using a self-learn device, a length of a dome shaft of a dome arranged in an apex region of the container with the use of at least two multiple echoes classified by the multiple-echo detection device.

6. A non-transitory computer-readable medium for storing a program element which, when executed on a processor of a fill-level measuring device, instructs the processor to initiate the following steps:
   acquiring, using an echo-curve acquisition device, at least one echo curve from reflections of electromagnetic or acoustic waves, the waves emitted in a direction of a surface of at least one of the feed material and an interface between two feed materials;
   evaluating, using an echo identification device, the at least one echo curve;
   classifying, using a multiple-echo detection device, at least one echo of a multiple reflection from at least one of (a) a feed material surface and (b) a bottom of a container as a multiple echo; and
   automatically determining, using a self-learn device, a length of a dome shaft of a dome arranged in an apex region of the container with the use of at least two multiple echoes classified by the multiple-echo detection device.

7. A fill-level measuring device for determining a position of a fill level of at least one of (a) a feed material and (b) an interface between two feed materials in a container using electromagnetic or acoustic waves which are emitted in a direction of a surface of at least one of the feed material and the interface, comprising:
  an echo-curve acquisition device configured to acquire at least one echo curve from reflections of the waves;
  an echo identification device configured to evaluate the at least one echo curve;
  a multiple-echo detection device configured to classify at least one echo of a multiple reflection from at least one of (a) a feed material surface and (b) a bottom of the container as a multiple echo; and
  a self-learn device configured to automatically determine a length of a dome shaft of a dome arranged in an apex region of the container with the use of a multiple echo in the echo curve, classified by the multiple-echo detection device, and a feed material echo in the echo curve.

* * * * *